United States Patent
Adkinson et al.

(10) Patent No.: US 9,045,626 B2
(45) Date of Patent: Jun. 2, 2015

(54) BUTYL IONOMER LATEX

(75) Inventors: Dana K. Adkinson, London (CA); Rayner B. Krista, Strathroy (CA); Rui Resendes, Kingston (CA)

(73) Assignee: LANXESS International S.A., Granges-Paccot (CH)

( * ) Notice: Subject to any disclaimer, the term of this patent is extended or adjusted under 35 U.S.C. 154(b) by 0 days.

(21) Appl. No.: 13/816,559

(22) PCT Filed: Aug. 11, 2011

(86) PCT No.: PCT/CA2011/050486
§ 371 (c)(1),
(2), (4) Date: Aug. 21, 2013

(87) PCT Pub. No.: WO2012/019301
PCT Pub. Date: Feb. 16, 2012

(65) Prior Publication Data
US 2014/0045986 A1    Feb. 13, 2014

Related U.S. Application Data

(60) Provisional application No. 61/373,379, filed on Aug. 13, 2010.

(51) Int. Cl.
*C08K 5/00* (2006.01)
*C08L 9/10* (2006.01)
*C08L 23/36* (2006.01)
*C08J 3/05* (2006.01)
*C08K 3/20* (2006.01)

(52) U.S. Cl.
CPC . *C08L 9/10* (2013.01); *C08L 23/36* (2013.01); *C08J 3/05* (2013.01); *C08K 3/20* (2013.01)

(58) Field of Classification Search
USPC ............................................... 524/236
See application file for complete search history.

(56) References Cited

U.S. PATENT DOCUMENTS

| | | | |
|---|---|---|---|
| 2,356,128 A | 8/1944 | Thomas et al. | |
| 2,944,038 A | 7/1960 | Hunter et al. | |
| 3,005,804 A | 10/1961 | Miller et al. | |
| 3,983,062 A | 9/1976 | Baldwin et al. | |
| 5,162,445 A | 11/1992 | Powers et al. | |
| 7,078,453 B1 | 7/2006 | Feeney et al. | |
| 7,119,138 B1 | 10/2006 | Feeney et al. | |
| 7,238,736 B2 | 7/2007 | Parent et al. | |
| 7,446,151 B2 | 11/2008 | Resendes et al. | |
| 7,662,480 B2 | 2/2010 | Resendes et al. | |
| 7,918,333 B1 | 4/2011 | Swanson | |
| 8,063,119 B2 | 11/2011 | Feeney et al. | |
| 2007/0218296 A1 | 9/2007 | Resendes et al. | |
| 2008/0207815 A1* | 8/2008 | Resendes et al. | 524/445 |
| 2012/0178848 A1 | 7/2012 | Adkinson et al. | |

FOREIGN PATENT DOCUMENTS

| | | |
|---|---|---|
| CA | 2458741 A1 | 8/2005 |
| CA | 2418884 C | 7/2010 |

OTHER PUBLICATIONS

Synthesis of Butyl Rubber by Cationic Polymerization, Ullmann's Encyclopedia of Industrial Chemistry, vol. A23, 1993, pp. 288-295.
Morton, Rubber Technoogy, 3rd Edition, Chapter 10, Van Nostrand Reinhold Company, 1987, pp. 297-300.
Parent et al., Ion-Dipole Interaction Effects in Isobutylene-based Ammonium Bromide Ionomers, J. Polymer Science, Part A: Polymner Chemistry, vol. 43, Wiley Periodicals, 2005, pp. 5671-5679.
Parent et al., Isobutylene-based ionomer composites: siliceous filler reinforcement, J. Polymer, Polymer 45, 2004, Elsevier, pp. 8091-8096.
Parent et al., Synthesis and Characterization of Isobutylene-Based Ammonium and Phosphonium Bromide Ionomers, Macromolecules 2004, 37, American Chemical Society, pp. 7477-7483.
Kaszas, et al., Abstract, Synthesis, Bromination and Cure of Isobutylene/Isoprene/P-Methylstyrene and Isobutylene/Isoprene/Styrene Terpolymers, Rubber Chemistry and Technology, Mar. 2002, vol. 75, No. 1, American Chemical Society, pp. 155-169.
Encyclopedia of Polymer Science and Engineering, vol. 4, Composites, Fabrication to Die Design, Compounding, 1986, John Wiley & Sons, New York, 1986, pp. 66-79.

* cited by examiner

*Primary Examiner* — Ling Choi
*Assistant Examiner* — Thuy-Ai Nguyen

(57) ABSTRACT

The invention relates to a latex composition wherein the latex composition comprises a butyl ionomer or partially halogenated butyl rubber ionomer. The latex composition is formed by dissolving the butyl ionomer in a suitable solvent, emulsifying the polymer in the solvent, adding water and optionally a minor amount of a suitable surfactant system to the emulsion and concentrating the emulsion to remove the water. The advantages of butyl ionomer latex include lower emulsifier levels, increased latex stability, improved interaction and adhesion to polar substrates and surfaces. Through the judicious choice of emulsifiers and/or washing to remove excess emulsifier a film with enhanced non-extractable polymeric antimicrobial function can be created. These properties of ionomer latex are useful in coatings, dipped goods and sponge applications.

19 Claims, No Drawings

BUTYL IONOMER LATEX

FIELD OF THE INVENTION

The invention relates to the process of preparing a synthetic latex starting from a butyl ionomer or partially halogenated butyl rubber ionomers.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene. As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as co-monomers. Commercial butyl comprises a major portion of isoolefin and a minor amount, not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmann's Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300. CA 2,418,884 and 2,458,741 describe the preparation of butyl-based, peroxide-curable compounds which have high multiolefin content. Specifically, CA 2,418,884 describes the continuous preparation of IIR with isoprene levels >4.1 mol %. Halogenation of this high multiolefin butyl rubber produces a reactive allylic halide functionality within the elastomer. With these elevated levels of isoprene now available, it is possible to generate BIIR analogues which contain allylic bromide functionalities ranging from greater than 3 mol %.

The presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from the reaction of a nitrogen or phosphorous based nucleophile and the allylic halide sites in the BIIR to produce an ammonium or phosphonium ionic group respectively. The physical properties of these BIIR based ionomers (green strength, modulus, filler interactions etc.) are superior to those of their non-ionomeric counterpart.

It has been previously discovered that the addition of para-methylstyrene to the mixed feed of butyl polymerizations (MeCl, IB and IP mixed feed, with $AlCl_3/H_2O$ as initiator) results in a high molecular weight polymer with up to 10 mol % of styrenic groups randomly incorporated along the polymer chain (Kaszas, U.S. Pat. No. 6,960,632; Kaszas et al. Rubber Chemistry and Technology, 2001, 75, 155). The incorporation of para-methylstyrene is found to be uniform throughout the molecular weight distribution due to the similarity in reactivity with isobutylene. The isoprene moieties within the butyl terpolymers can be halogenated by conventional methods.

A copolymer may be formed comprising a $C_4$-$C_7$ isomonoolefin, such as isobutylene, and a comonomer, such as para-alkylstyrene, preferably para-methylstrene, wherein some of the alkyl substituent groups present in the styrene monomer units contain a benzylic halogen or other functionality copolymer. Additional functional groups can be incorporated by nucleophilic displacement of the benzylic halogen with a variety of nucleophiles as described in U.S. Pat. No. 5,162,445. Use of tertiary amines and phosphines results in the formation of ionomers with improved physical properties from these copolymers.

The preparation and use of butyl latex has been reported previously (see for example U.S. Pat. Nos. 2,944,038, 3,005,804, 3,983,062, 7,119,138, WO 2006/115729, WO 2005/063871, WO 2005/061608). However, one of the biggest factors in the preparation of these latexes is the ease of making the latex and the final stability of the latex. The stability of the latex is commonly achieved by the use of surfactants. While surfactants act as stabilizers during production, they typically have a detrimental effect on the properties of a dry latex film, for example, due to their tendency to migrate and adversely affect the end use properties of the material (i.e. adhesion, resistance to the growth of microbes). Surfactants may also cause the unwanted blooming that leads to surface irregularities in the resulting latex that is applied to a substrate. Once a latex film is formed surfactants will leach or be extracted when in contact with aqueous solutions. It would therefore be desirable to reduce or eliminate the need for surfactants in forming a butyl latex.

U.S. Pat. No. 7,238,736 describes the improved filler dispersion observed when using butyl ionomers as compared to regular butyl resulting in articles with improved tensile strength. It would be desirable to provide improved filler dispersion in a butyl latex.

U.S. Pat. No. 7,915,333 describes compositions where improved barrier properties are observed with butyl ionomers and nanocomposites while maintaining tensile properties. It would be desirable to provide improved barrier properties in a butyl latex.

WO2010/091499 describes butyl ionomer compositions having anti-microbial and anti-bacterial properties. It would be desirable to provide improved anti-microbial properties in a butyl latex.

U.S. Pat. No. 7,662,480 describes improved adhesion of butyl ionomers to a substrate as compared to a non-ionomeric butyl rubber. It would be desirable to provide improved coating adhesion in a butyl latex.

There is therefore a need for improved butyl latexes, preferably exhibiting some or all of the above desirable properties.

SUMMARY OF THE INVENTION

According to an aspect of the present invention, there is provided a butyl rubber latex composition comprising a butyl rubber ionomer. The butyl rubber ionomer may be made from a halogenated butyl rubber, which may be reacted with a nitrogen or phosphorous based nucleophile. The ionomeric content of the ionomer may be greater than 0.1 mol %. The ionomer may be emulsified in water and may for a stable emulsion at room temperature. The solids content of the composition may be in the range of from 7 to 80 wt %. The latex is desirably free of surfactants and/or surfactant residues or has reduced surfactant and/or surfactant residue content. The surfactant concentration may be in the range of from 1 to 15 wt %, 1 to 20 wt %, or 1 to 30 wt %. The composition may be useful in the formation of un-cured articles, such as dipped articles, blown films or calendered films, or surface coatings for articles, such as paints.

According to another aspect of the invention, there is provided a process for making a butyl rubber latex composition comprising: preparing a first solution of a butyl rubber ionomer comprising a nitrogen or phosphorous based nucleophile in a polar organic solvent and adding a fatty acid to the solution; preparing a second solution of water having a basic pH and a surfactant; and, mixing the first and second solutions to form a latex emulsion.

According to yet another aspect of the present invention, there is provided a surface coating for an article, the coating comprising a butyl rubber latex comprising a butyl rubber ionomer.

The resulting butyl rubber latex (and coatings made therefrom) advantageously has improved stability with reduced occurrence of blooming as compared with conventional non-ionomeric butyl rubber latexes. The resulting butyl rubber latex (and coatings made therefrom) also desirably exhibits superior physical properties, superior barrier properties, superior anti-microbial properties and superior adhesion as compared with conventional non-ionomeric butyl rubber latexes. The process for creating the butyl rubber latex is easier to control and operate than conventional butyl rubber latex processes, due to the simplification arising from reducing or eliminating the need for surfactants.

DETAILED DESCRIPTION OF THE INVENTION

The present invention provides for a butyl rubber latex comprising, generally, a butyl rubber ionomer or a partially halogenated butyl rubber ionomer. The terms butyl rubber ionomer or partially halogenated butyl rubber ionomer are referred to collectively herein as "ionomer."

The ionomer of the present invention is prepared from a halogenated butyl rubber polymer. Butyl rubber polymers are generally derived from at least one isoolefin monomer, at least one multiolefin monomer and optionally further copolymerizable monomers.

In one embodiment, the ionomer may comprise repeating units derived from an isoolefin monomer and a conjugated diene monomer. In another embodiment, the butyl ionomer may comprise repeating units derived from an isoolefin monomer and a styrenic monomer. In yet another embodiment, the butyl ionomer may comprise repeating units derived from an isoolefin monomer, a conjugated diene monomer and a styrenic monomer. In embodiments comprising repeating units derived from a conjugated diene monomer, the number of olefin bonds derived from such units may comprise a conventional amount or an elevated amount of greater than 2.2 mol %, greater than 3.0 mol %, greater than 4.1 mol %, greater than 5.0 mol %, greater than 6.0 mol %, greater than 7.0 mol %, greater than 7.5 mol %, or greater than 8.0 mol %.

The butyl rubber polymer is not limited to a specific isoolefin. Any isoolefin, as known to those of skill in the art, are contemplated by the present invention including isoolefins having, for example, within the range of from 4 to 16 carbon atoms. In one embodiment of the present invention, isoolefins having from 4-7 carbon atoms are contemplated. Examples of isoolefins for use in the present invention include isobutene, 2-methyl-1-butene, 3-methyl-1-butene, 2-methyl-2-butene, 4-methyl-1-pentene and mixtures. A preferred isoolefin is isobutene (isobutylene).

Similarly, the butyl rubber polymer is not limited to a specific multiolefin. Multiolefins copolymerizable with the isoolefins, as known to one skilled in the art, can be used in the practice of the present invention. Suitable multiolefins include, for example, those having in the range of from 4-14 carbon atoms. Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof. Multiolefin monomers comprising a conjugated diene are preferred. A particularly preferred conjugated diene is isoprene.

In another embodiment of the present invention, the butyl rubber may further include an additional co-monomer, as known to those of skill in the art, other than the above referenced multiolefins. Co-monomers include monomers copolymerizable with the isoolefins and/or dienes. Co-monomers suitable for use in the present invention include, for example, styrenic monomers, such as alkyl-substituted vinyl aromatic co-monomers, including but not limited to a $C_1$-$C_4$ alkyl substituted styrene. Specific examples of such co-monomers include, for example, α-methyl styrene, p-methyl styrene, chlorostyrene, cyclopentadiene and methylcyclopentadiene. In this embodiment of the present invention, the butyl rubber polymer may include, for example, random copolymers of isobutylene, isoprene and para-methylstryene.

In yet another embodiment of the present invention, an isoolefin monomer, as described above, is polymerized with a styrenic monomer, for example an alkyl-substituted vinyl aromatic co-monomer, including but not limited to a $C_1$-$C_4$ alkyl substituted styrene. Specific examples of styrenic monomers include, for example, α-methyl styrene, p-methyl styrene, chlorostyrene, cyclopentadiene and methylcyclopentadiene. In this embodiment, the butyl rubber polymer may include, for example, random copolymers of isobutylene and para-methylstryene.

Butyl rubber polymers, as described above, are formed from a mixture of monomers described herein. In one embodiment, the monomer mixture comprises from about 80% to about 99% by weight of an isoolefin monomer and from about 1% to 20% by weight of a multiolefin monomer. In another embodiment, the monomer mixture comprises from about 85% to about 99% by weight of an isoolefin monomer and from about 1% to 15% by weight of a multiolefin monomer. In certain embodiments of the present invention three monomers may be employed. In these embodiments, the monomer mixture comprises about 80% to about 99% by weight of isoolefin monomer, from about 0.5% to about 5% by weight of a multiolefin monomer and from about 0.5% to about 15% by weight a third monomer copolymerizable with the isoolefin or multiolefin monomer. In one embodiment, the monomer mixture comprises from about 85% to about 99% by weight of an isoolefin monomer, from about 0.5% to about 5% by weight of a multiolefin monomer and from about 0.5% to about 10% by weight of a third monomer copolymerizable with the isoolefin or multiolefin monomers. In yet another embodiment, the monomer mixture comprises from about 80% to about 99% by weight of an isoolefin monomer and from about 1% to 20% by weight of a styrenic monomer.

Once the butyl rubber polymer is formed from the monomer mixture, the butyl rubber polymer may be subjected to a halogenation process in order to form the halogenated butyl rubber polymer or halobutyl rubber polymer. Bromination or chlorination can be performed according to the process known by those skilled in the art as in, for example, the procedures described in Rubber Technology, 3rd Ed., Edited by Maurice Morton, Kluwer Academic Publishers, pp. 297-300 and further documents cited therein.

In one embodiment of the present invention, the ionomers may be prepared from a halogenated butyl rubber polymer having from 0.5 to 2.2 mol % of the multiolefin monomer. For example, a halogenated butyl rubber for use in the present invention includes a halogenated butyl rubber having isobutylene and less than 2.2 mole percent isoprene which is commercially available from LANXESS Deutschland GmbH and sold under the name BB2030. In another embodiment of the present invention, the ionomers may be prepared from a halogenated butyl rubber polymer having a higher multiolefin content, for example greater than 2.5 mol %. In yet another embodiment, the ionomers may be prepared from a halogenated butyl rubber having a multiolefin content of greater than 3.5 mol %. In still another embodiment, the multiolefin content of the halogenated butyl rubber is greater than 4.0 mol %. In even another embodiment, the multiolefin content of the halogenated butyl rubber is greater than 7.0 mol %. The preparation of a suitable high multiolefin butyl rubber polymer, for use in the present invention, is described in co-pending application CA 2,418,884, which is incorporated herein by reference.

During halogenation of the butyl polymer, some or all of the multiolefin content of the butyl polymer is converted to allylic halides. These allylic halide sites in the halobutyl polymer result in repeating units derived from the multiolefin monomers originally present in the butyl polymer. The total allylic halide content of the halobutyl polymer may not exceed the starting multiolefin content of the parent butyl polymer. The allylic halide sites allow for reacting with and attaching a nucleophile to the halobutyl polymer. In one embodiment of the present invention, the allylic halide sites of the halobutyl polymer are reacted with at least one nitrogen or phosphorus containing nucleophile having the following formula,

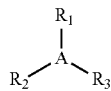

wherein,
A is a nitrogen or phosphorus; and,
$R_1$, $R_2$ and $R_3$ are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

Nucleophiles for use in the present invention include, for examples, those nucleophiles having at least one neutral nitrogen or phosphorus center which possesses a lone pair of electrons that are electronically and sterically accessible for participation in nucleophilic substitution reactions. Suitable nucleophiles, for use in the present invention include, for examples, trimethylamine, triethylamine, triisopropylamine, tri-n-butylamine, trimethylphosphine, triethylphosphine, triisopropylphosphine, tri-n-butylphosphine, triphenylphosphine, diphenylphosphinostyrene, allyldiphenylphosphine, diallylphenylphosphine, diphenylvinylphosphine, triallylphosphine, 2-dimethylaminoethanol, 1-dimethylamino-2-propanol, 2-(isopropylamino)ethanol, 3-dimethylamino-1-propanol, N-methyldiethanolamine, 2-(diethylamino) ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino) phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy) ethyl]amine, 3-(dibenzylamino)-1-propanol, N-vinyl caprolactam, N-vinyl phthalimide, 9-vinyl carbazole, or N-[3-(Dimethylamino)propyl]methacrylamide, and mixtures thereof.

In one embodiment of the present invention, the amount of nucleophile reacted with the butyl rubber may be in the range of from 0.05 to 5 molar equivalents. In another embodiment, the amount of nucleophile reacted with the butyl rubber may be in the range of from 0.5 to 4 molar equivalents. In yet another embodiment, the ratio of nucleophile reacted with the butyl rubber is 1 to 3 molar equivalents. The ratios of nucleophile to butyl rubber are based on the total molar amount of allylic halide present in the halobutyl polymer.

As stated above, the nucleophile reacts with the allylic halide functionality of the halobutyl polymer resulting in units of ionomeric moieties where the allylic halide functionality existed on the halobutyl polymer. The total content of ionomeric moiety in the butyl ionomer may not exceed the starting amount of allylic halide in the halobutyl polymer; however, residual allylic halides and/or residual multiolefins may be present. In embodiments of the present invention where substantially all of the allylic halides sites are reacted with the nucleophile, a butyl rubber ionomer is formed. In embodiments where less than all the allylic halide sites are reacted with the nucleophile, a partially halogenated butyl rubber ionomer is formed.

In one embodiment of the present invention, the resulting ionomer possesses an ionic content of at least 0.1 mol % of the ionomeric moiety up to an amount not exceeding the original allylic halide content of the halobutyl polymer used to produce the butyl ionomer. In another embodiment, the ionomer possesses an ionic content of at least 0.5 mol % of the ionomeric moiety up to an amount not exceeding the original allylic halide content of the halobutyl polymer used to produce the butyl ionomer. In yet another embodiment, the ionomer possesses an ionic content of at least 1.0 mol % of the ionomeric moiety up to an amount not exceeding the original allylic halide content of the halobutyl polymer used to produce the butyl ionomer. In yet another embodiment, the ionomer possesses an ionic content of at least 1.5 mol % of the ionomeric moiety up to an amount not exceeding the original allylic halide content of the halobutyl polymer used to produce the butyl ionomer.

In some cases, residual allylic halides may be present in an amount of from 0.1 mol % up to an amount not exceeding the original allylic halide content of the halobutyl polymer used to produce the butyl ionomer. In other embodiments, residual multiolefin may be present in an amount of from 0.1 mol % up to an amount not exceeding the original multiolefin content of the butyl polymer used to produce the halobutyl polymer. In one embodiment, the residual multiolefin content of the ionomer is at least 0.2 mol %. In another embodiment, the residual multiolefin content of the ionomer is at least 0.6 mol %. In yet another embodiment, the residual multiolefin content of the ionomer is least 0.8 mol %. In yet another embodiment, the residual multiolefin content of the ionomer is least 1.0 mol %. In yet another embodiment, the residual multiolefin content of the ionomer is at least 2.0 mol %. In yet another embodiment, the residual multiolefin content of the ionomer is least 3.0 mol %. In yet another embodiment, the residual multiolefin content of the ionomer is at least 4.0 mol %.

In one embodiment of the present invention, the ionomer may comprise repeating units derived from at least one isoolefin monomer, at least 0.2% of repeating units derived from at least one multiolefin monomer, and at least one nitrogen or phosphorous based nucleophile. The butyl rubber ionomer or partially halogenated butyl rubber ionomer may be formed by preparing a monomer mixture comprising the isoolefin and a multiolefin, reacting the monomer mixture to form a polymer, halogenating the polymer to form halo functional sites on the polymer, and reacting the halo functional sites with the nucleophile.

Although it is desirable to reduce or eliminate the need for surfactants, the butyl rubber latex according to the invention may include minor amounts of surfactants for use as emulsifiers in improving emulsification of the rubber/solvent mixture in water. These surfactants can be, but are not limited to, anionic, cationic, nonionic or ampoteric surfactants. Surfactants which may be used are those which are known from and conventionally used in the field of polymer dispersion. The surfactants are generally added to the aqueous phase. The following may be used, for example, as surfactants in the process according to the invention: aliphatic and/or aromatic hydrocarbons with 8 to 30 carbon atoms which have a hydrophilic terminal group such as a sulphonate, sulphate, carboxylate, phosphate or ammonium terminal group. Furthermore, non-ionic surfactants with functional groups, such as polyalcohols, polyethers and/or polyesters are suitable as emulsifiers. In principle, any conventional industrial surfactants which are suitable for stabilizing polymer dispersions in water may be used. The following are preferably used as surfactants: fatty acids salts such as the sodium and/or potassium salts of oleic acid, the corresponding salts of alkylaryl sulphonic acids, naphthyl sulphonic acid and their condensation products with, for instance, formaldehyde, and the corresponding salts of alkylsuccinic acids and alkylsulphosuccinic acids. Obviously, it is also possible to use the emulsifiers in any mixture with each other. Suitable surfactants include fatty acids, rosin acids and detergent emulsifiers. The fatty acid may contain 4-28 carbon atoms, preferably 4-24 carbon atoms, and more preferably 12-24 carbon atoms. Examples of a suitable fatty acid include oleic acid, palmitolinic acid, palmitic acid, linoleic acid, linolenic acid, lauric acid, myristic acid, stearic acid, arachidic acid, lignoceric acid, arachidonic acid, trans-hexadecenoic acid, elaidic acid, lactobacillic acid, tuberculostearic acid and cerebronic acid or mixtures thereof. Surfactant systems may also be based on a phosphate surfactant, a sulfonate surfactant, surfactants derived from a carboxylic acid and a base or an anionic surfactant or any combination thereof. Addition of a polyoxyethylated alkyl phenols act to suppress foam formation when soaps are used as the emulsifiers and as a stabilizer of the finished latex. An example of a suitable polyoxyethylate alkyl phenol includes Triton X™. An example of a polyvinyl alcohol based surfactant is Elvanol™. The surfactant concentration may be from 1 to 15 wt %, from 1 to 20 wt %, from 1 to 26 wt %, from 1 to 29 wt %, or from 1 to 30 wt % calculated on a dry weight basis of the final composition.

Suitable solvents to form the latex include hexane, heptane, octane, isooctane, nonane, decane, dichloromethane, toluene, cyclohexane, pentane, carbon tetrachloride, trichloroethylene, and methyl ethyl ketone. Addition of a base along with the fatty acid produces a soap in situ, which functions as the main emulsifier. Suitable bases include but are not limited to sodium hydroxide, lithium hydroxide, ethanolamine, potassium hydroxide or mixtures thereof.

After emulsification, the solvent is removed from the emulsion. Additionally, the solution can be heated above 100° C. to remove water if a concentrated latex is desired. A preferred solids content is from 5 to 90 wt %, from 6 to 80 wt %, from 6 to 30 wt %, from 30 to 70 wt %, or from 40 to 60 wt %.

The butyl rubber ionomer latex composition according to the present invention may include one or more fillers. Suitable fillers for use in the present invention are composed of particles of a mineral, such as, for example, silica, silicates, clay, bentonite, vermiculite, nontronite, beidelite, volkonskoite, hectorite, saponite, laponite, sauconite, magadiite, kenyaite, ledikite, gypsum, alumina, titanium dioxide, talc and the like, as well as mixtures thereof.

Further examples of suitable fillers include:
highly dispersable silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as Al, Mg, Ca, Ba, Zn, Zr and Ti;
synthetic silicates, such as aluminum silicate and alkaline earth metal silicate;
magnesium silicate or calcium silicate, with BET specific surface areas of 20 to 400 m$^2$/g and primary particle diameters of 10 to 400 nm;
natural silicates, such as kaolin and other naturally occurring silica;
natural clays, such as montmorillonite and other naturally occurring clays;
organophilically modified clays such as organophilically modified montmorillonite clays (e.g. Cloisite® Nanoclays available from Southern Clay Products) and other organophilically modified naturally occurring clays;
glass fibers and glass fiber products (matting, extrudates) or glass microspheres;
metal oxides, such as zinc oxide, calcium oxide, magnesium oxide and aluminum oxide;
metal carbonates, such as magnesium carbonate, calcium carbonate and zinc carbonate;
metal hydroxides, e.g. aluminum hydroxide and magnesium hydroxide or combinations thereof.

In one embodiment of the present invention, the mineral filler is silica. In another embodiment the mineral filler is silica prepared by the carbon dioxide precipitation of sodium silicate.

Dried amorphous silica particles suitable for use as mineral fillers in accordance with the present invention may have a mean agglomerate particle size in the range of from 1 to 100 microns. In one embodiment of the present invention, the dried amorphous silica particles have a mean agglomerate particle size in the range of from 10 and 50 microns. In another embodiment of the present invention, the dried amorphous silica particles have a mean agglomerate particle size in the range of from between 10 and 25 microns. In one embodiment of the present invention, it is contemplated that less than 10 percent by volume of the agglomerate particles are below 5 microns or over 50 microns in size. Suitable amorphous dried silica has, for example, a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially sold under the names HiSil 210, HiSil 233 and HiSil 243 available from PPG Industries Inc. Also suitable are Vulkasil S and Vulkasil N, commercially available from Bayer AG.

Mineral fillers, as used in the present invention, can also be used alone or in combination with known non-mineral fillers, such as:
  carbon blacks; suitable carbon blacks are preferably prepared by the lamp black, furnace black or gas black process and have BET specific surface areas of 20 to 200 $m^2/g$, for example, SAF, ISAF, HAF, FEF or GPF carbon blacks; or
  rubber gels, preferably those based on polybutadiene, butadiene/styrene copolymers, butadiene/acrylonitrile copolymers and polychloroprene.

High aspect ratio fillers useful in the present invention include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. In one embodiment of the present invention, high aspect ratio fillers have an aspect ratio of at least 1:5. In another embodiment of the present invention, high aspect ratio fillers have an aspect ratio at least 1:7. Yet in another embodiment, high aspect ratio fillers have an aspect ratio 1:7 to 1:200. Fillers in accordance with the present invention may have, for example, a mean particle size in the range of from 0.001 to 100 microns In anther embodiment, fillers have a mean particle size in the range of from 0.005 and 50 microns. In another embodiment, fillers have a mean particle size in the range of from 0.01 and 10 microns. A suitable filler may have a BET surface area, measured in accordance with DIN (Deutsche Industrie Norm) 66131, of between 5 and 200 square meters per gram.

In one embodiment of the present invention, high aspect ratio fillers comprises a nanoclay, such as, for example, an organically modified nanoclay. The present invention is not limited to a specific nanoclay; however, natural powdered smectite clays, such as sodium or calcium montmorillonite, or synthetic clays such as hydrotalcite and laponite are suitable examples as starting materials. In one embodiment, the high aspect fillers include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment of the present invention, onium ions are phosphorus based (eg: phosphonium ions) and nitrogen based (eg: ammonium ions) and contain functional groups having from 2 to 20 carbon atoms (eg: $NR_4^{+-}$ MMT).

The clays may be provided, for example, in nanometer scale particle sizes, such as, less than 25 μm by volume. In one embodiment, the particle size is in the range of from 1 to 50 μm. In another embodiment, the particle size is in the range of from 1 to 30 μm. In yet another embodiment, the particle size is in the range of from 2 to 20 μm.

In addition to silica, the nanoclays may also contain some fraction of alumina. In one embodiment, the nanoclays may contain from 0.1 to 10 wt % alumina. In another embodiment the nanoclays may contain from 0.5 to 5 wt % alumina. In yet anther embodiment, the nanoclays may contain from 1 to 3 wt % alumina.

Examples of commercially available organically modified nanoclays suitable for use in the present invention as high aspect ratio fillers include, for example, those sold under the tradename Cloisite® clays 10A, 20A, 6A, 15A, 30B, or 25A. In one embodiment, the high aspect ratio fillers may be added to the pre-formed butyl rubber iononmer to form a nanocomposite in an amount of from 3 to 80 phr. In another embodiment, the amount of high aspect ratio fillers in the nanocomposite is from 5 to 30 phr. In yet another embodiment, the amount of high aspect ratio fillers in the nanocomposite is from 5 to 15 phr.

In one aspect of the invention, the butyl rubber ionomer latex exhibits improved adhesion to non-polar substrates, such as steel, glass or polytetrafluoroethylene, as compared with non-ionomeric butyl latexes. The improvement in adhesion may be determined using a planar separation technique, for example using a Tel-Tac™ adhesion test apparatus. The improvement in adhesion may be from 1 to 25%.

The butyl rubber ionomer latex may be cured or uncured. When cured, the butyl rubber ionomer latex may comprise components derived from a curing system. The choice of curing system suitable for use is not particularly restricted and is within the purview of a person skilled in the art. In certain embodiments of the present invention, curing system may be sulphur-based, peroxide-based resin based or UV-based. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which may be used in the amount of from about 1 to about 10. In another embodiment of the present invention, the zinc oxide may be used in an amount of from about 2 to about 5, parts by weight per hundred parts by weight butyl polymer in the nanocomposite. Elemental sulfur, comprising component (ii) of the preferred curing system is typically used in amounts of from about 0.2 to about 2 parts by weight, per hundred parts by weight butyl polymer in the composition. Suitable sulfur-based accelerators (component (iii) of the preferred curing system) may be used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). In one embodiment of the present invention, the sulphur based accelerator is mercaptobenzothiazyl disulfide.

Peroxide based curing systems may also be suitable for use in the present invention for butyl rubber ionomer latexes including residual multiolefin content in excess of about 0.2 mol %. For example, a peroxide-based curing system may comprises a peroxide curing agent, for example, dicumyl peroxide, di-tert-butyl peroxide, benzoyl peroxide, 2,2'-bis (tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert.-butylperoxy)-2,5-dimethyl hexane and the like. One such peroxide curing agent comprises dicumyl peroxide and is commercially available under the name DiCup 40C. In one embodiment, the peroxide curing agent is used in an amount of 0.2 to 7 parts per hundred parts of rubber (phr). In another embodiment, the peroxide curing agent is used in an amount of 1 to 6 phr. In yet another embodiment, the peroxide curing agent is used in an amount of about 4 phr. Peroxide curing co-agents can also be used in the present invention. Suitable peroxide curing co-agents include, for example, triallyl isocyanurate (TAIC), commercially available under the name DIAK 7 from DuPont Or N,N'-m-phenylene dimaleimide know as HVA-2 (DuPont Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers containing increased levels of unsaturation, for example a multiolefin content of at least 0.5 mol %. Additionally, the degree of unsaturation can be increased by selection of a phosphorous or nitrogen-based nucleophile containing a pendant vinyl group such as but not limited to diphenylphosphinestyrene, allyldiphenylphosphine, diallylphenylphosphine, diphenylvinylphosphine, triallylphosphine, N-vinyl caprolactam, N-vinyl phthalimide, 9-vinyl carbazole, or N-[3-(dimethylamino)propyl]methacrylamide.

In some embodiments of the present invention, stabilizers, anti-oxidants, tackifiers, and/or other additives as known to those of skill in the art may also be added in the usual way and in the normal amounts.

In embodiments where the latex composition includes the ionomer, fillers, curing agents, and/or other additives, the ingredients used to form the ionomer may be mixed together prior to dissolving the ionomer in the solvent. The ingredients may be mixed using conventional compounding techniques. Suitable compounding techniques include, for example, mixing the ingredients of the composite together using, for example, an internal mixer, such as a Banbury mixer, a miniature internal mixer, such as a Haake or Brabender mixer, or a two roll mill. An extruder also provides good mixing, and permits shorter mixing times. It is possible to carry out the mixing in two or more stages, and the mixing can be done in different apparatus, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding. Additionally, fillers, curing agents, and/or other additives may be added to the ionomer latex.

In one embodiment of the present invention, the ionomer latex may be formed into a shaped article or applied to an existing article. The article may be made entirely from the ionomer latex. Alternatively, a portion of the article may comprise the ionomer latex. The ionomer latex may be provided on the surface of the article only. The ionomer latex may be attached to the surface, for example adhesively or via fasteners. The ionomer may be provided as part of a composite material comprising a plastic. The plastic may comprise polyethylene, polypropylene, an EP polymer, an EPDM polymer, or a nylon polymer. The composite material may comprise a thermoplastic vulcanizate comprising the butyl ionomer and the plastic material.

The ionomer latex may be provided as a surface coating for the article. The surface coating may be in the form of an applied membrane (of any suitable thickness), a chemical vapour deposit, or a powder coating. The coating may further comprise a plastic.

The ionomer latex may be provided, as part of a coating or otherwise, with the proviso that no additionally added antibacterial, antifungal or antialgal agents are present, particularly such agents that could leach out of the coating. The coating may consist essentially of the ionomer latex, which is meant to include any fillers or curative agents that may be present as part of the ionomer latex.

The article may comprise: a fluid conduit, such as a hose or pipe; a container, such as a bottle, tote, storage tank, etc.; a container closure or lid; a seal or sealant, such as a gasket or caulking; a material handling apparatus, such as an auger or conveyor belt; a marine vessel or structure, such as a ship, dock, or oil drilling platform; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing; or, footwear, particularly portions of footwear that come into direct contact with the foot.

Additional examples where the butyl rubber ionomer latex may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

In one aspect of the invention, the ionomer latex exhibits antibacterial, antifungal and/or antialgal properties. This feature of the ionomer is believed to be a result of the ionic nature of the formed ionomer. Although the inventors do not intend to be bound by theory, it is believe that the ionic nature of the ionomer imparts antibacterial, antifungal and/or antialgal properties not observed in typical halogenated butyl rubber.

The butyl rubber ionomer latex may reduce a population of and/or prevent accumulation of organisms associated with bio-fouling, for example bacteria, fungi, algae, mollusca or arthropoda. In particular, the ionomer latex may be useful in preventing the growth of a bio-film on at least a surface of an article comprising the ionomer. Preventing the growth of a bio-film may comprise preventing the formation of a continuous layer of organisms associated with bio-fouling over greater than 25%, 50% or 75% of the surface of the article. The ionomer latex may prevent accumulation of organisms by preventing an increase in population of the organisms. The ionomer latex may prevent accumulation of organisms by impeding attachment of the organisms to the article, particularly the portion or portions of the article comprising the ionomer. The ionomer latex may reduce the population of the organisms by killing individual organisms (for example, via cell membrane disruption) or by inhibiting reproduction of the organisms (for example, by affecting cellular DNA). A combination of the aforementioned mechanisms may be present simultaneously.

The unique properties of butyl ionomers enhance the performance of butyl ionomer latex. The resulting latex may be useful in applications which are paint-like wherein a thin layer is applied and the ionomer latex provides benefits of adhesion, flexibility, and antimicrobial properties. Additionally, the resulting latex may be applied in the form commonly used in dipped goods to provide a coating with improved flexibility in a variety of applications including chemical protective gloves, face masks, protective suits. Other uses include low permeability coatings for sports balls, rubber hoses, inflatable boats and other inflatable products, bladders used in production and to protect storage tanks, window sealings, inner tubes for bicycles, as well as tires. Additionally, the butyl ionomer latex may be used to prepare a surface for an additional process such as rubber to cord adhesion in tire manufacturing. Finally, the latex may be spray dried to form a butyl ionomer powder that may be used in powder coating applications or the powder may be an additive to a powder composition. The ionic moieties of butyl based Ionomers exhibit affinity for each other resulting in a high level polymer chain to polymer chain interaction which is the basis of their high green strength and thermoplastic like behavior.

The ionomer latex according to the present invention may be used in cured or uncured form.

Whereas particular embodiments of this invention have been described above for purposes of illustration, it will be evident to those skilled in the art the numerous variations of the details of the present invention may be made without departing from the invention as defined in the appended claims.

The following examples will be used to illustrate particular embodiments of the invention.

Example 1

62.5 g of BB2030™ was dissolved in 585 mL of $CH_2Cl_2$ followed by the addition of 12.5 g of oleic acid. Separately, a base solution composed of 5 g of ethanolamine, 3.9 g of Triton X-100™ and 3.4 g of Elvanol™ in 125 mL of distilled and deionized water was prepared. The rubber cement was added to a high speed blender, and the base solution was slowly added. Upon completion of saponification (~5 minutes after addition of base solution), 250 mL of distilled water was added to the blender. The mixture was continued to blend with an air purge over the top of the blender opening. After 5 h of mixing, the latex was separated. Upon separation, the emulsion broke.

Example 2

356 g of LANXESS BB2030™ and 16.7 g (1.2 molar equivalents based on allylic bromide content) of triphenylphosphine (TPP) were premixed on a 6"×12" mill at room temperature for 3 minutes. The mixture was then passed through a twin screw extruder at 160° C. Analysis of the final product by $^1H$ NMR confirmed the complete conversion of all the allylic bromide of BB2030™ to the corresponding ionomeric species with an ionic content of 0.8 mol %.

Example 3

62.5 g of Example 2 was dissolved in 585 mL of $CH_2Cl_2$ followed by the addition of 12.5 g of oleic acid. Separately, a base solution composed of 5 g of ethanolamine, 3.9 g of Triton X-100™ and 3.4 g of Elvanol™ in 125 mL of distilled and deionized water was prepared. The rubber cement was added to a high speed blender, and the base solution was slowly added. Upon completion of saponification (~5 minutes after addition of base solution), 250 mL of distilled water was added to the blender. The surfactant concentration on a dry weight basis was 28.4%. The mixture was continued to blend with an air purge over the top of the blender opening. After 5 h of mixing, the solids content of the resulting latex was determined to be 7.61%. The ionomer latex was found to be stable.

Example 4

LANXESS BB2030™ was passed through a twin screw extruder at 160° C. where N,N-dimethylaminoethanol (DMAE) was added at a rate of 0.4 mL/min. Analysis of the final product by $^1H$ NMR confirmed the presence of 0.8 mol % ammonium ionic groups.

Example 5

62.5 g of Example 4 was dissolved in 585 mL of $CH_2Cl_2$ followed by the addition of 12.5 g of oleic acid. Separately, a base solution composed of 5 g of ethanolamine, 3.9 g of Triton X-100™ and 3.4 g of Elvanol™ in 125 mL of distilled and deionized water was prepared. The rubber cement was added to a high speed blender, and the base solution was slowly added. Upon completion of saponification (~5 minutes after addition of base solution), 250 mL of distilled water was added to the blender. The mixture was continued to blend with an air purge over the top of the blender opening. After 5 h of mixing, the latex was separated and the solids content was determined to be 6.23%.

Example 6

US 2007/0218296 A1, which is incorporated herein by reference, describes the preparation of high isoprene BIIR. 62.5 g of high isoprene BIIR was dissolved in 585 mL of $CH_2Cl_2$ followed by the addition of 12.5 g of oleic acid. Separately, a base solution composed of 5 g of ethanolamine, 3.9 g of Triton X-100™ and 3.4 g of Elvanol™ in 125 mL of distilled and deionized water was prepared. The rubber cement was added to a high speed blender, and the base solution was slowly added. Upon completion of saponification (~5 minutes after addition of base solution), 250 mL of distilled water was added to the blender. The mixture was continued to blend with an air purge over the top of the blender opening. After 5 h of mixing, the latex was separated. Upon separation, the emulsion broke.

Example 7

204 g of brominated high isoprene BIIR and 8.04 g (1.2 molar equivalents based on allylic bromide content of the brominated high isoprene BIIR) of triphenylphosphine (TPP) were premixed on a 6"×12" mill at room temperature for 3 minutes. The mixture was then passed through a twin screw extruder at 160° C. Analysis of the final product by $^1H$ NMR confirmed the complete conversion of the allylic bromide to the corresponding ionomeric species with an ionic content of 0.8 mol %.

Example 8

62.5 g of Example 7 was dissolved in 585 mL of $CH_2Cl_2$ followed by the addition of 12.5 g of oleic acid. Separately, a base solution composed of 5 g of ethanolamine, 3.9 g of Triton X-100™ in 125 mL of distilled and deionized water was prepared. The rubber cement was added to a high speed blender, and the base solution was slowly added. Upon completion of saponification (~5 minutes after addition of base solution), 250 mL of distilled water was added to the blender. The mixture was continued to blend with an air purge over the top of the blender opening. After 5 h of mixing, the latex was separated and the solids content was determined to be 8.06%.

Example 9

62.5 g of Example 2 was dissolved in 585 mL of $CH_2Cl_2$ followed by the addition of 12.5 g of oleic acid. Separately, a base solution composed of 3.75 g of ethanolamine, 3 g of Triton X-100™ and 2.6 g of Elvanol™ in 95 mL of distilled water was prepared. The rubber cement was added to a high speed blender, and the base solution was slowly added. Upon completion of saponification (~5 minutes after addition of base solution), 250 mL of distilled water was added to the blender. The surfactant concentration on a dry weight basis was 25.9%. The mixture was continued to blend with an air purge over the top of the blender opening. After 1.5 h of mixing, the latex was separated and the solids content was determined to be 9.4%. The ionomer latex was found to be stable.

Example 10

62.5 g of Example 2 was dissolved in 585 mL of $CH_2Cl_2$ followed by the addition of 12.5 g of oleic acid. Separately, a base solution composed of 3.75 g of ethanolamine, 3 g of Triton X-100™ and 2.6 g of Elvanol™ in 95 mL of distilled water was prepared. The rubber cement was added to a high speed blender, and the base solution was slowly added. Upon completion of saponification (~5 minutes after addition of base solution), 125 mL of distilled water was added to the blender. The surfactant concentration on a dry weight basis was 25.9%. The mixture was continued to blend with an air purge over the top of the blender opening. After 1.5 h of mixing, the latex was separated and the solids content was determined to be 14%. The ionomer latex was found to be stable.

Example 11

62.5 g of Example 2 was dissolved in 585 mL of $CH_2Cl_2$ followed by the addition of 12.5 g of oleic acid. Separately, a base solution composed of 3.75 g of ethanolamine, 3 g of Triton X-100™ and 2.6 g of Elvanol™ in 95 mL of distilled water was prepared. The rubber cement was added to a high speed blender, and the base solution was slowly added. Upon completion of saponification (~5 minutes after addition of base solution), 65 mL of distilled water was added to the blender. The mixture was continued to blend with an air purge over the top of the blender opening. After 1.5 h of mixing, the latex was separated and the solids content was determined to be 26%. The ionomer latex was found to be stable.

Example 12

10 phr (based on 11 wt % solids) was added to Example 9. The solution was mixed for 2.5 hours and results in a stable latex whereby no separation of the latex was observed.

Example 13

10 phr of Microlite 923 (based on 11 wt %) was added to Example 9. The solution was mixed for 2.5 hours and resulted in a well dispersed, stable latex whereby no separation was observed.

Example 14

10 phr of Cloisite 15A (based on 11 wt %) was added to Example 9. The solution was mixed for 2.5 hours and resulted in a stable latex whereby no separation of the latex was observed.

Example 16

10 phr Mistron HAR (based on 11 wt %) was added to Example 9. The solution was mixed for 2.5 hours and resulted in a stable latex whereby no separation of the latex was observed Example 17

10 phr of Nanomer 1.44P (supplied by Nanocore) and 0.4 eq of TPP (based on allylic bromide) was added to BB2030™ under heat and shear conditions resulting in a butyl ionomer nanocomposite. 62.5 g of this nanocomposite was dissolved in 585 mL of $CH_2Cl_2$ followed by the addition of 12.5 g of oleic acid. Separately, a base solution composed of 5 g of ethanolamine, 3.69 g of Triton X-100 and 3.4 g of Elvanol in 125 mL of hot distilled water was prepared. The rubber cement was added to a high speed blender, and the base solution was slowly added. Upon completion of saponification (~5 minutes after addition of base solution), 700 mL of distilled water was added to the blender. The mixture was continued to blend with an air purge over the top of the blender opening. After 1.8 h of mixing, the latex was separated and the solids content was determined to be 10%. The ionomer latex was found to be stable.

What is claimed:

1. A butyl rubber latex composition comprising a butyl rubber ionomer made from a halogenated butyl rubber reacted with a nitrogen or phosphorous based nucleophile, and emulsified in water in the presence of a fatty acid-based surfactant and another surfactant.

2. The composition according to claim 1, wherein the composition further comprises a surfactant concentration in the range of from 1 to 30 wt %.

3. The composition according to claim 2, wherein the ionomeric content of the ionomer is greater than 0.1 mol %.

4. The composition according to claim 2, wherein the emulsion is stable at room temperature.

5. The composition according to claim 2, wherein the emulsion has a solids content in the range of from 7 to 80 wt %.

6. A butyl rubber latex composition comprising a butyl rubber ionomer made from a halogenated butyl rubber reacted with a nitrogen or phosphorous based nucleophile, the ionomer having an ionomeric content of greater than 0.1 mol % and is emulsified in water in the presence of a fatty acid surfactant and another surfactant to form a stable emulsion at room temperature, wherein the emulsion has a solids content in the range of from 7 to 80 wt %.

7. The composition according to claim 6, wherein the composition comprises a surfactant concentration in the range of from 1 to 30 wt %.

8. A process for making a butyl rubber latex composition comprising:
   a. preparing a first solution of a butyl rubber ionomer comprising a nitrogen or phosphorous based nucleophile in a polar organic solvent and adding a fatty acid-based surfactant to the solution;
   b. preparing a second solution of water having a basic pH and another surfactant; and, c. mixing the first and second solutions to form a latex emulsion.

9. The process according to claim 8, wherein the ionomer has an ionomeric content of greater than 0.1 mol %.

10. The process according to claim 8, wherein the emulsion is stable at room temperature.

11. The process according to claim 8, wherein the emulsion has a solids content of from 7 to 80 wt %.

12. The process according to claim 8, wherein the second solution comprises a basic amine.

13. The process according to claim 12, wherein the basic amine comprises an aminoalcohol.

14. The process according to claim 8, wherein the surfactant in the second solution is present in a concentration of from 1 to 30 wt %.

15. The process according to claim 8, wherein the polar solvent is halogenated.

16. The process according to claim 15, wherein the polar solvent comprises chloromethane, dichloromethane or chloroform.

17. The composition according to claim 2, wherein the composition further comprises a high aspect ratio filler.

18. The composition according to claim 6, wherein the composition further comprises a high aspect ratio filler.

19. The process according to claim 8, wherein the process further comprises mixing a high aspect ratio filler with the butyl rubber ionomer prior to preparing the first solution.

* * * * *